US012522163B2

United States Patent
Rosenthal et al.

(10) Patent No.: US 12,522,163 B2
(45) Date of Patent: Jan. 13, 2026

(54) METHOD FOR FUNCTION CONTROL ON A VEHICLE UNDER CONSIDERATION OF A DETECTED LEVEL OF ATTENTION OF A PERSON IN AN INTERIOR OF THE VEHICLE

(71) Applicant: Brose Fahrzeugteile SE & Co. Kommanditgesellschaft, Bamberg, Bamberg (DE)

(72) Inventors: Markus Rosenthal, Bamberg (DE); Matthias Gempel, Bamberg (DE)

(73) Assignee: BROSE FAHRZEUGTEILE SE & CO. KOMMANDITGESELLSCHAFT, BAMBERG, Bamberg (DE)

( * ) Notice: Subject to any disclaimer, the term of this patent is extended or adjusted under 35 U.S.C. 154(b) by 169 days.

(21) Appl. No.: 18/685,856

(22) PCT Filed: Aug. 22, 2022

(86) PCT No.: PCT/EP2022/073288
§ 371 (c)(1),
(2) Date: Apr. 15, 2024

(87) PCT Pub. No.: WO2023/025707
PCT Pub. Date: Mar. 2, 2023

(65) Prior Publication Data
US 2024/0351541 A1    Oct. 24, 2024

(30) Foreign Application Priority Data
Aug. 23, 2021   (DE) .................... 10 2021 209 235.7

(51) Int. Cl.
*B60R 16/037*     (2006.01)
*G01S 17/86*      (2020.01)
*G08B 21/24*      (2006.01)

(52) U.S. Cl.
CPC ............ *B60R 16/037* (2013.01); *G01S 17/86* (2020.01); *G08B 21/24* (2013.01)

(58) Field of Classification Search
CPC ........ B60R 16/037; G01S 17/86; G08B 21/24
See application file for complete search history.

(56) References Cited

U.S. PATENT DOCUMENTS

2008/0234899 A1*   9/2008   Breed .................. B60N 2/0278
                                                     701/1
2009/0259369 A1*  10/2009   Saban .................. B60N 2/0025
                                                     701/45

(Continued)

FOREIGN PATENT DOCUMENTS

DE    102016004530 A1    10/2017
DE    102016012708 A1     4/2018

(Continued)

OTHER PUBLICATIONS

ISA European Patent Office, International Search Report Issued in Application No. PCT/EP2022/073288, Dec. 15, 2022, WIPO, 4 pages.

*Primary Examiner* — Tan Q Nguyen
(74) *Attorney, Agent, or Firm* — McCoy Russell LLP

(57) ABSTRACT

It is provided a method for function control on a vehicle, the method having at least the following steps: detecting a useful item in the surroundings of the vehicle or in an interior of the vehicle by at least one sensor device of the vehicle, and triggering at least one function on the vehicle depending on at least one detected operator event and the detection of the useful item. The at least one operator event comprises a presence of at least one person in the interior, and a level of attention of the at least one person directed (Continued)

towards a portion of the interior, on which the at least one triggered function is dependent, being detected by the at least one sensor device.

17 Claims, 4 Drawing Sheets

(56) References Cited

U.S. PATENT DOCUMENTS

| | | | |
|---|---|---|---|
| 2014/0309806 A1* | 10/2014 | Ricci | G06F 21/31 701/1 |
| 2017/0048376 A1* | 2/2017 | Logan | H04M 1/72415 |
| 2018/0114388 A1 | 4/2018 | Nagler | |
| 2018/0173230 A1* | 6/2018 | Goldman-Shenhar | B60W 50/08 |

FOREIGN PATENT DOCUMENTS

| | | |
|---|---|---|
| DE | 102018220104 A1 | 5/2020 |
| DE | 102019204632 A1 | 10/2020 |
| DE | 102019211165 A1 | 12/2020 |
| DE | 102019209625 A1 | 1/2021 |
| DE | 102019220390 A1 | 6/2021 |
| DE | 102022203831 A1 | 10/2022 |
| EP | 2960111 B1 | 6/2018 |
| FR | 3048110 A1 | 8/2017 |

\* cited by examiner

"METHOD FOR FUNCTION CONTROL ON A VEHICLE UNDER CONSIDERATION OF A DETECTED LEVEL OF ATTENTION OF A PERSON IN AN INTERIOR OF THE VEHICLE"

CROSS REFERENCE TO RELATED APPLICATIONS

The present application is a U.S. National Phase of International Application No. PCT/EP2022/073288 entitled "METHOD FOR FUNCTION CONTROL ON A VEHICLE UNDER CONSIDERATION OF A DETECTED LEVEL OF ATTENTION OF A PERSON IN AN INTERIOR OF THE VEHICLE," and filed on Aug. 22, 2022. International Application No. PCT/EP2022/073288 claims priority to German Patent Application No. 10 2021 209 235.7 filed on Aug. 23, 2021. The entire contents of each of the above-listed applications are hereby incorporated by reference for all purposes.

BACKGROUND

The proposed solution relates in particular to a method for controlling at least one function on a vehicle.

It is already well known from the automotive industry to identify an operator event on adjustment components of a vehicle, and to electronically trigger a function depending thereon. Thus, for example an operating element, for example a switch, button or touch panel, can be actuated by a user, in order to adjust a vehicle seat, in a purposeful manner, into a particular seat position. In the same way, what are referred to as pre-crash systems are known, which, prior to a possible accident of a vehicle, actuate adjustment components within the vehicle interior, for example a seatbelt, headrests on a vehicle seat, or the like, on the basis of a sensor signal of at least one sensor device, in order to as far as possible reduce the risk of injury for a vehicle occupant in the event of a crash.

SUMMARY

Furthermore, in the near future, autonomous or at least largely autonomous driving of motor vehicles is conceivable. This development in particular is associated with increased variability in the arrangement of components in an interior of a vehicle. In this case, there is an increased need for additional comfort functions for a user of a vehicle, in order to offer the user additional added value, in particular in day-to-day use of the vehicle.

Proceeding herefrom, the proposed solution provides a method for controlling at least one function on a vehicle comprising features as described herein.

In this case, it is proposed that at least one function on a vehicle is dependent on at least one detected operator event and a detected useful item in the surroundings of the vehicle or in an interior of the vehicle, wherein the detected operator event includes at least one presence of at least one person in the interior of the vehicle. Furthermore, a level of attention of the at least one person directed towards a portion of the interior, on which the at least one triggered function is dependent, is detected by the at least one sensor device.

Consequently, in the proposed solution at least one function on the vehicle is controlled in a manner dependent on the presence of at least one person and a useful item. In this case, a useful item is understood to mean an object which is not intended to remain permanently in the vehicle, and which in particular is not fixed on the vehicle, in a manner secured to the body, as an interior component or a part thereof. Rather, the useful item can be a personal object introduced only temporarily into the interior of the vehicle by a vehicle user, in particular a vehicle occupant, and intended to be taken out again. If such a useful item and the presence of the at least one person is detected electronically, in the surroundings of the vehicle or in the interior of the vehicle, by at least one sensor device of a control system of the vehicle, then at least one function is triggered on the vehicle. As a result, functions that are object-related and that presuppose the presence of a person can be able to be triggered automatically.

By way of example, a signal or an indication relating to the useful item detected with the vehicle user can be transmitted, thereby, to a vehicle user. In particular but not exclusively, according to the proposed solution, in local public transport vehicles, in response to the presence of at least one person and their detected level of attention, a signal for the at least one person can be output to a particular vehicle.

In this case, the detection of the useful item can in particular relate to situations in which the useful item is detected in the surroundings of the vehicle, and it is to be assumed that a vehicle user has placed said useful item in the interior of the vehicle (vehicle interior). Alternatively or additionally, triggering of at least one function on the vehicle can be dependent on a detection of a useful item in an interior of the vehicle, such that the presence of the useful item in the vehicle interior and the presence of at least one person in the vehicle interior leads to electronic triggering of at least one function on the vehicle.

In general, the proposed solution can also comprise the identification of a plurality of vehicle occupants and/or detection of a plurality of useful items. In this case, a vehicle occupant is not necessarily a person sitting in the vehicle. Rather, vehicle occupants can also be other people located in the vehicle interior. By way of example, a vehicle occupant can also be a person standing in the vehicle interior or moving in the vehicle interior.

In this case, useful item-dependent triggering of a function of a plurality of different functions on a vehicle can offer additional comfort for a vehicle user. For example, this in particular includes the possibility of taking particular measures within a vehicle interior in order to draw the attention of a vehicle user to useful items which may have been unintentionally left behind in a vehicle interior.

In the course of the proposed solution, it is provided to detect a level of attention of the at least one person directed towards a portion of the interior, using the at least one sensor device, wherein this can in particular be a visual or acoustic level of attention.

By way of example, the sensor device can be coupled to an arithmetic unit, which is configured to evaluate data acquired by the at least one sensor device with respect to the direction of the directed level of attention of the at least one person.

Likewise, the control device can evaluate data acquired by the at least one sensor device with respect to the direction of the directed level of attention of the at least one person.

In a variant, the directed level of attention can be a visual level of attention. The visual level of attention, acquired by sensors, can include a (current) viewing direction of the at least one person. In this case, by means of an evaluation of the data acquired by the at least one sensor device, it is possible to detect, and thus automatically determine, the portion of the interior towards which the view of the at least one person is directed. By way of example, for this purpose an orientation of a head of the at least one person within the vehicle interior can be detected. In this case, a vision cone can be associated with the head. The vision cone can describe the amount of possible viewing directions in the case of a fixed head position. According thereto, it is possible to detect the portion of the vehicle interior to which the vision cone of the at least one person is directed.

In an alternative or supplementary variant, the directed level of attention can be an acoustic level of attention. The acoustic level of attention can include a (current) listening direction, from which sound waves can be particularly effectively perceived by the person in question. This can in particular include the orientation of the ears, and thus of the head, of the person within the vehicle interior. Furthermore, possible obstacles around the person can be detected, which lead to partial or complete shadowing of the person with respect to soundwaves from a particular direction. According thereto, it is possible to detect the portion of the vehicle interior from which soundwaves can reach the at least one person effectively.

In general, both the visual and the acoustic level of attention can be detected. As a result, the perceptibility of signals output by the signal output device for a plurality of surroundings situations can be improved. In the case of a plurality of people located in the vehicle interior, the directed level of attention can be detected for each of the plurality of people.

Via the electronically detected directed level of attention of the at least one person it is determined, for example, to what extent an indication of the useful item still present in the vehicle, which indication is reproduced in a region of the interior and is for example visually and/or acoustically perceptible, is currently most likely to be perceived by at least one person. Thus, the triggered function is dependent on the at least one detected directed level of attention, for example with respect to the region of the interior in which the respective function is to be triggered. This for example includes the situation where the particular one of the possible plurality of display and/or illumination elements of the vehicle that is actuated depends on the detected level of attention.

The triggering of the at least one function on the vehicle can in principle be dependent, in addition to the detection of the mere presence of the useful item, on an electronic classification of the useful item to a predefined object class. Thus, for example, the detected useful item can be associated with one of possibly a plurality of predefined object classes, wherein different functions are triggered, depending on the assigned object class. In this case, an object class, and thus a particular type of object, can be learnt for a useful item, also for example in a teach-in mode of a control system. In this case, the useful item or at least one learning object that is representative of the useful item is used for storing an association between the useful item and a particular object class, in the vehicle-side control system. Thus, for example using an electronic control device, which for example also executes a classification software, sensor measurement data of the at least one sensor device are then evaluated, and it is identified from this whether a useful item located in the surroundings of the vehicle or in the vehicle interior belongs to a particular object class. Consequently, using one or more stored object classes, a particular function can be triggered in a purposeful manner, specifically depending on the object classes, and optionally only after detection of an operator event linked to the object class, or a combination of cumulatively or sequentially occurring operator events.

In addition, a plurality of (at least two) triggerable functions can be distinguished from one another depending on the object classes, even if the same operator event is detected. Thus, for example, an operator event triggered on the user side can be specified by a particular gesture which a user performs in the vehicle interior. However, the same gesture then leads to a different function, depending on the detected useful item and depending on the object class to which said useful item is assigned. Thus, for example, for a particular object class which is representative of a mobile telephone and/or a vehicle key, after the vehicle has been left, and/or after another operator event triggered on the user side, such as performing a particular gesture, a notification of the useful item still located in the vehicle interior can be generated and output. If, in contrast, the detected useful item is associated with a different object class, which for example represents a suitcase or a bag, then generation of a corresponding indication or generation of another indication does not take place, in response to the same operator event.

For example, an adjustment, which is dependent on the object class and is actuated by external force, of at least one adjustment component present in the interior of the vehicle, can be triggered by the association with a predefined object class. This for example includes the possibility of an adjustment component being electronically controlled and externally actuated, i.e. in particular actuated by motor and/or via at least one spring element, automatically in the interior of the vehicle, when a useful item of a predefined object class is detected in the surroundings of the vehicle. Thus, for example, it is known from the prior art to adjust an adjustment part on the vehicle, by which a body opening is closed at least in part, in a manner actuated by external force, when a person approaches a vehicle (with or without a useful item carried by the person). Thus, for example when a person approaches the vehicle, a vehicle door can be opened automatically, in a manner actuated by external force. As part of a proposed variant of the proposed solution, however, alternatively or in addition to an adjustment of an adjustment part of this kind, an electronically controlled adjustment of an adjustment component within the vehicle, depending on a detected useful item, is provided. If for example a bulky useful item is detected, or a useful item of a corresponding object class is identified, for example an adjustment component within the vehicle interior is adjusted automatically, in order to increase a load surface in the vehicle interior. In this case, an adjustment component can be adjusted for example precisely in the region of the body opening in the surroundings of which the useful item or the person carrying the useful item was detected, in order to achieve an enlargement of a load surface in said region in which the useful item is also likely to be loaded.

In a possible development, the at least one adjustment component and/or a particular type of adjustment of the at least one adjustment component are associated with the predefined object classes. Thus, a predetermined adjustment component within the vehicle interior can be adjusted only in the case of detected useful items of particular object classes, and/or particular adjustment movements of the same adjustment component can be assigned only to particular object classes. Thus, for example, an adjustment or a combination of adjustments of a plurality of adjustment components on the interior side can take place by calling up a stored adjustment scenario, depending on the object class linked thereto and thus following detection of a particular type of useful item which is assigned to said object classes. For example, during loading of a bulky useful item, a different adjustment then takes place automatically, for example an adjustment of a vehicle seat, compared with when loading a small part.

The at least one adjustment component that is to be adjusted can for example be a load-through, a (different) component of a vehicle seat, or a vehicle seat itself.

Alternatively or in addition, depending on the assignment of the useful item to a predefined object class, an actuation of at least one illumination and/or display element present in the interior of the vehicle can take place. Consequently, in a variant of this kind, it is not, or not only, the case that an adjustment component in the vehicle interior is adjusted depending on whether a detected useful item can be associated with a particular object class. Rather, in a variant of this kind, at least one illumination and/or display element is activated, for example in order to indicate, in a visually perceptible manner, that the useful item is present in the vehicle interior. This in particular includes the situation where a storage location of the useful item within the vehicle interior is lit up or illuminated by an illumination element. Consequently, in this case, one of optionally a plurality of actuatable illumination elements is activated depending on whether the illumination element is located in the vicinity of a detected storage location of the useful item.

The at least one actuated illumination and/or display element can in principle also be associated with the predefined object class. Thus, for example a different illumination can be activated in the event of loading a bulky useful item compared with loading a small item. Thus, in particular, an object-dependent actuation of the interior illumination of the vehicle can take place, for example in order to offer a particular deposition location for a useful item that is to be temporarily deposited therein and transported, or to provide a directed indication, in a visually perceptible manner, of a current deposition location of a useful item, in the vehicle interior, that is still to be unloaded.

In a variant, the triggering of the at least one function on the vehicle is additionally dependent on where and/or when, in the surroundings of the vehicle or in the vehicle interior, the useful item is identified, and/or where the vehicle is located. In this case, information regarding place and time can in particular be taken into account for what is known as intention identification. Thus, for example, the triggering of a particular function is linked to the fulfilment of particular stored spatial and/or temporal conditions, using GPS data and/or time indications and/or reference data previously learnt, optionally also automatically by means of machine learning. For example, in this connection, the triggering of the at least one function on the vehicle can take place only when the useful item is detected in a particular region in the surroundings of the vehicle, and/or in a particular time window.

In a variant, the at least one triggered function comprises wireless transmission of a message to at least one mobile terminal, in particular a mobile communications device, and/or the display of a visual indication on a display element on the vehicle. A variant of this kind is advantageous for example in order to make a user of the vehicle aware of a useful item that has possibly been forgotten in the vehicle interior. In this case, the message sent to the mobile terminal can for example contain image and/or text data, in order to provide information on a current deposition location for the useful item. The wireless sending of the message takes place for example by means of a transmission unit on the vehicle side. Likewise, a corresponding indication can be output on a display element of the vehicle, for example a display provided in a pane of the vehicle.

In a variant, the at least one sensor device provided for detecting the useful item operates in a contactless manner. For this purpose, the at least one sensor device comprises, for example, a camera, in particular a stereo camera or a time-of-flight (ToF) camera, and//or a radar and/or lidar sensor. Using a correspondingly wirelessly operating sensor device, in particular a vehicle interior can be monitored for the presence of a (particular) useful item.

In particular in the case of monitoring of a vehicle interior by means of a camera and/or a radar or lidar sensor, it is also possible for the message, sent to the at least one mobile terminal, to contain image data for an image of the useful item acquired by the at least one sensor device.

In an alternative variant or an alternative application scenario, the operator event for example additionally includes a vehicle occupant leaving the vehicle, which is detected electronically. This is then for example a (further) trigger criterion, in order to possibly provide information about whether a useful item is still present in the vehicle interior which was intended to remain only temporarily in the vehicle interior, and thus may have been forgotten. Thus, for example a previously authenticated user leaving the vehicle, and/or at least one vehicle occupant present in the vehicle for at least a minimum time period leaving the vehicle, can then also trigger an indication function, in order to indicate to the user or vehicle occupant that a useful item is still located in the vehicle interior. A minimum time period (of e.g. at least 5 or 10 minutes), which a vehicle occupant has to have spent in the vehicle interior before said occupant leaving the vehicle interior triggers an object detection, can for example prevent unloading processes, in which a person visits the vehicle repeatedly, only very briefly, from always triggering the respective function again.

In a further embodiment of the proposed solution, the control device can assign the at least one detected useful item to the at least one person. In particular, in the case of a plurality of people located in the vehicle interior, the at least one detected useful item can be associated with exactly one person of the plurality of people. As a result, output signals can be individualizable.

By way of example, the control device can be configured to evaluate, by means of electronic (evaluation) logics, the data acquired by the at least one sensor device of the vehicle, in order to assign the at least one useful item to at least one of the people.

The control unit can furthermore be configured to determine, using the data received by the at least one sensor device, both people and useful items, as well as relative distances between people or useful items, and between people and useful items. Based on the relative distances, the control unit can be configured to associate each detected useful item with a person, via the logics.

It is likewise conceivable and possible to associate exactly one of the detected useful items with a plurality of people. As a result, by way of example, in the case of an association which is not possible without ambiguity, the useful item can be associated with all people in question. Furthermore, large useful items, which are conveyed by a plurality of people can be associated with each person of the plurality.

In one embodiment, each useful item can be associated with the person who is at the smallest distance from the useful item. In the case of people moving relative to the useful item, a relative distance can be based on a temporal average. Alternatively or in addition, in the case of a moving person, the association can take place at a predetermined timepoint.

In one embodiment, the association can take place when the person enters the vehicle interior. According thereto, each useful item can be associated with the person who is at a minimum distance from the useful item upon entering the vehicle interior.

In one embodiment of the proposed solution, the association can use a result of an electronic classification of the at least one useful item which temporally precedes the association. In particular, an association can be performed only for particular object classes. By way of example, only those useful items can be associated which were not previously classified as permanently loaded into the vehicle. Unnecessary associations of useful items intentionally deposited in the vehicle interior can thus be reducible. This can save computing capacity.

In one embodiment of the proposed method, the object classes can in particular include a class for forgotten useful items. By way of example, a useful item associated with the at least one person can be classified as a forgotten useful item if a relative distance between the useful item and the at least one associated person exceeds a threshold value. Furthermore, the classification as a forgotten useful item can be reversed if the relative distance between the useful item and the at least one associated person falls below a predetermined threshold value.

Alternatively or in addition, the association can include a determination of an association likelihood. In this case, the association likelihood can correspond to a calculated likelihood of the association made being correct. In particular, the calculated likelihood can take into account an error propagation of measurement errors.

In the case of the calculation of the association likelihood, the at least one detected useful item can be associated with the person for whom the greatest association likelihood has been calculated. In the event of a plurality of association likelihoods for a plurality of people differing by only a predetermined value, each of the plurality of people can be associated with the useful item. In general, a plurality of useful items can also be associated with exactly one person.

For example, an indication can be output to a person using displayed symbols and/or texts. This includes, for example, the case where arrows, optionally with explanatory text, explicitly indicate the deposition location of the item to a person. In general, the visually output indication can for example also be configured in a manner dependent on how many people are looking at the same display region of a display element. In this case, different display scenarios can also be provided. Thus, for example, a person who is likely to get out of the vehicle next or has already got out of the vehicle can be displayed, in a larger size, a person-specific indication, i.e. an indication associated with the person. In particular, for this purpose, a distance between the person and a display element provided for outputting the indication can be taken into account. In the case of a person who is further away, the indication is reproduced correspondingly larger than in the case of a person positioned closer to the display element. The reproduction form (e.g. geometry, color, illumination, text and/or size) of the indication can also depend on a body size, detected by sensor or stored, and/or on the age, of the associated person.

In a further embodiment of the proposed solution, the at least one person can be associated with a signal output device for outputting individualized signals, depending on the detected level of attention of the at least one person. The association of the signal output device can take place using the control unit.

Signal output devices of this kind can be any type of devices which are configured to output a signal that is perceptible for a person. In particular, signal output devices of this kind can comprise display elements (such as displays), illumination elements (i.e. also every kind of illuminant, and thus e.g. lamps or lighting strips) and/or loudspeakers. Visual and/or acoustic signals for people can be output thereby. Signals of this kind can in particular include texts and voice notifications.

The signal output device can be coupled to the control unit and can be configured to receive signal data from the control unit. The signal output device can furthermore be configured to output a signal into the vehicle interior in response to receiving the signal data and based on the signal data.

The vehicle can comprise a plurality of signal output devices distributed in the vehicle interior. The plurality of signal output devices can be arranged in the vehicle interior in such a way that at least one of the signal output devices is visible from each of the seats provided in the vehicle interior. At least one of the plurality of signal output devices can be arranged adjacently to the at least one vehicle door. This can increase a likelihood of a signal intended for the at least one person being perceived at the latest upon leaving the vehicle.

In one embodiment of the proposed method, the at least one person can be allocated the signal output device to which the directed level of attention of the at least one person is directed. As a result, it can be possible to output a signal in a targeted manner for the at least one person.

In view of the detection of the visual level of attention, the at least one person can be allocated the signal output device which is located within the vision cone. In the case of a plurality of signal output devices located in the vision cone, the at least one person can be allocated the signal output device which is at a minimum distance from a central axis of the vision cone. In the case of none of the signal output devices being located in the vision cone, the at least one person can be allocated the signal output device which is at a smallest distance from the vision cone. This can further improve the perceptibility of the visual signal output via the associated signal output device.

Alternatively or in addition, an acoustic or visual attention signal can indicate a signal output device associated with the at least one person. In particular in the case of no signal output device being located in the vision cone, the at least one person can be prompted, by the attention signal being output, to turn their head, and thus the vision cone, in the direction of one of the signal output devices. For this purpose, the attention signal can be output beside the signal output device to which the vision cone of the person is intended to be turned.

In view of the detection of the acoustic level of attention, the at least one person can be allocated the signal output device which is located in the direction of the listening direction. In the case of a plurality of equivalent listening directions and/or a plurality of signal output devices located in the listening direction, the at least one person can be allocated the signal output device which is at a minimum distance from the listening direction. This can further improve the perceptibility of the acoustic signal output via the associated signal output device.

In the case of both the visual and the acoustic level of attention being acquired, the at least one person can be assigned a signal output device which is optionally located in the listening direction and/or in the viewing direction. The selection can include a determination of whether a likelihood for perception of an acoustic signal is greater than a likelihood for perception of a visual signal. By way of example, the likelihood for perception of a visual signal in the case of a person reading a book may be lower than the likelihood for perception of an acoustic signal.

The signal output device, which is associated with the at least one person on the basis of the acoustic level of attention, can in particular be configured to output acoustic signals. The signal output device, which is associated with the at least one person on the basis of the acoustic level of attention, can in particular be configured to output acoustic signals.

If a plurality of people has been detected in the vehicle interior, each person of the plurality of people can in each case be associated with one signal output device.

In a further embodiment of the proposed solution, an individualized signal for the at least one person can be output via the associated signal output device, in response to a trigger condition. As a result, the signal can be output in a situation-related manner and in a manner targeted for one person.

Trigger conditions of this kind can, by way of example, be the at least one person leaving the vehicle, or the assumption that the at least one person will soon leave the vehicle.

In a variant, individualized signals can include graphical, text or acoustic indications. By way of example, the individualized signals can contain an indication that the at least one person wishes to check whether a useful item has been forgotten in the vehicle.

In one embodiment of the proposed solution, the individualized signal can be item-related. Such signals can, by way of example, include a graphical and/or text and/or acoustic indication of the useful item associated with the at least one person. By way of example, the item-related individualized signals can contain an indication that the at least one person wishes to check whether the mobile telephone associated with the person has been forgotten in the vehicle. Signals of this kind can, by way of example, also include representations of the associated useful item.

In a further embodiment of the proposed solution, the individualized signal can be class-related. Such signals can, by way of example, include a graphical and/or text and/or acoustic indication of the object class of the useful item associated with the at least one person. By way of example, the item-related individualized signals can contain an indication that the mobile telephone associated with the person has been forgotten in the vehicle.

In the case of a plurality of detected people, a plurality of individualized signals can be output via the at least one signal output device. In particular, a plurality of signals can also be output by exactly one of the signal output devices.

In general, the plurality of output signals can be individualizable for different people of the plurality of people. In this case, each of the signals can depend, in a graphical, text or acoustic embodiment, on the person and/or the useful item.

By way of example, the different embodiment can include a different volume and/or representation size, depending on a distance of the respective person from the signal output device. By way of example again, the different embodiment can include a different volume and/or representation size, depending on the classification of the useful item associated with the respective person. Likewise by way of example, the different embodiment can include a different volume and/or representation size, depending on a predicted remaining travel time of the person, or an age of the person, or a body size of the person.

The proposed solution furthermore also relates to a control system for the electronic control of at least one function of a vehicle, in particular a function in a vehicle interior of the vehicle, wherein the control system is configured to carry out a variant of a proposed control method.

The proposed solution likewise includes a computer program product for a control system of a vehicle, which comprises instructions which prompt at least one processor of the control system, when carrying out the instructions, to carry out a variant of a proposed control method.

Features and advantages, explained above and in the following, for variants of a proposed method thus also apply for variants of a proposed control system and a proposed computer program product.

BRIEF DESCRIPTION OF THE DRAWINGS

The accompanying drawings illustrate, by way of example, possible variants of the proposed solution.

DETAILED DESCRIPTION

Figure 1:
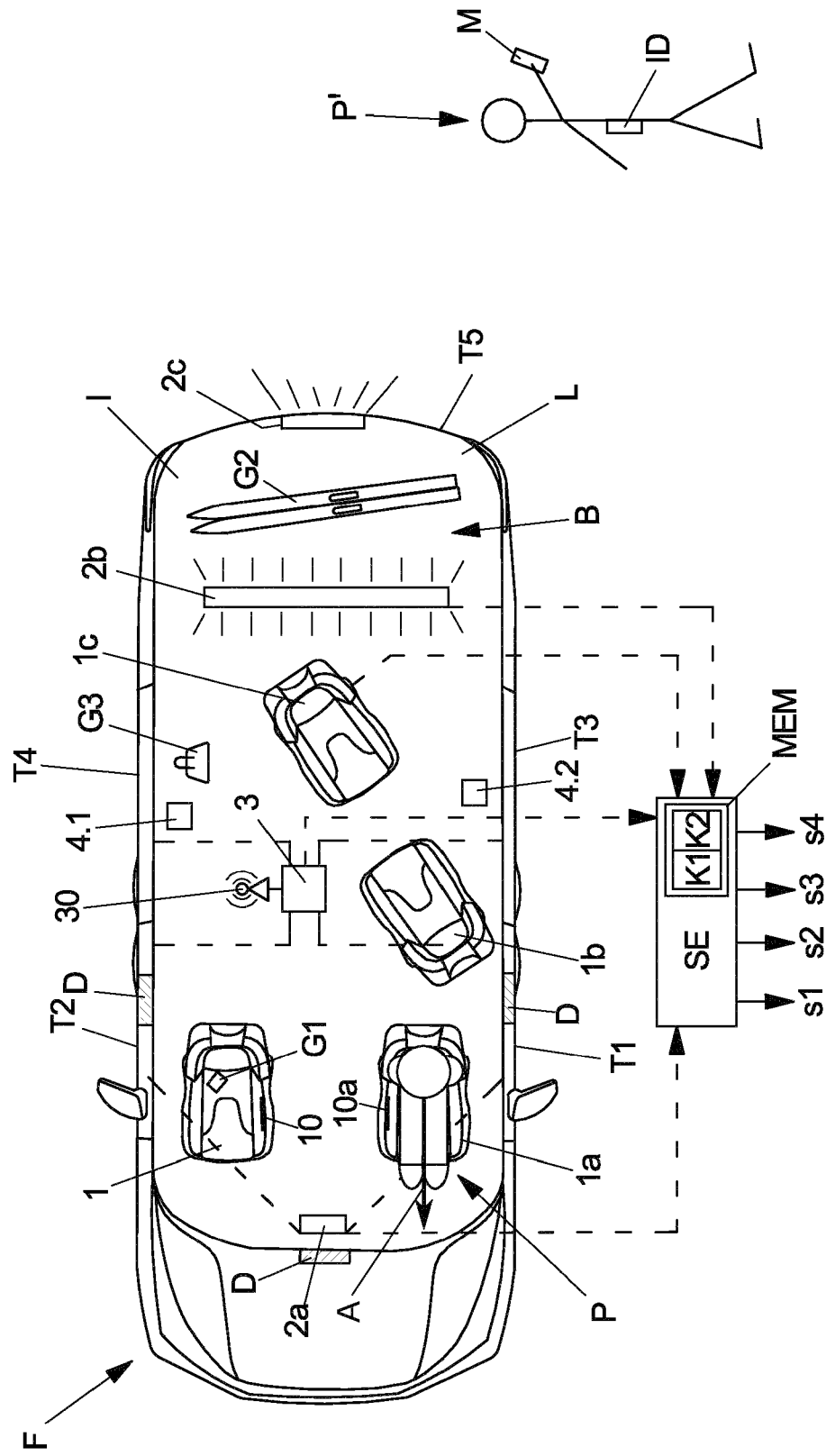
FIG. 1 is a plan view of a vehicle in which a control system is present, which implements variants of a proposed method.

FIG. 1 is a plan view, illustrating various application scenarios of the proposed solution, of a vehicle interior I of a vehicle F, in which inter alia different adjustment and interior components in the form of vehicle seats 1, 1a, 1b and 1c are arranged. Optionally further, adjustable adjustment components, such as adjustable armrests, adjustable backrests, and/or adjustable headrests can be provided on the vehicle seats 1, 1a, 1b and 1c. In the present case, the vehicle interior I also includes a rear cargo space L, on the vehicle floor B of which objects can be deposited. A person P, or a vehicle occupant, is located in the vehicle interior I on the driver's seat 1a.

Furthermore, in FIG. 1 illumination or display elements 10 or 10a are provided, by way of example, on two vehicle seats 1 and 1a. The respective vehicle seat 1 or 1a can be illuminated at least locally by a seat-side illumination element 10 or 10a. Information can be displayed to a user of the respective vehicle seat 1 or 1a, or also to other people P, P' inside or outside the vehicle F using a seat-side display element 10 or 10a, for example in the form of a display.

Furthermore, the vehicle interior I comprises a plurality of illumination elements 4.1 and 4.2 for illuminating the vehicle interior I. By way of example, two illumination elements 4.1 and 4.2 are shown for a rear region of the vehicle F. The illumination elements 4.1 and 4.2 are electronically actuatable in order to illuminate individual regions of the vehicle interior I in a targeted manner.

In the present case, the vehicle F comprises a plurality of sensor devices 2a, 2b and 2c. The vehicle interior I can be monitored using the sensor devices 2a and 2b, in particular with respect to the presence of any useful items G1, G2 or G3 and the presence of the person P in the vehicle interior I. In the present case, the further sensor device 2a is provided for monitoring a rear region in the surroundings of the vehicle F. Thus, for example the approach of a person P' to the vehicle F at a rear vehicle door in the form of a tailgate T5, and in particular any useful item carried by the approaching person P', can be detected in a contactless manner using the sensor device 2c. For respective monitoring, the sensor devices 2a, 2b and 2c comprise, for example, a camera, in particular a stereo camera or a ToF camera, and/or a radar and/or lidar sensor.

Sensor signals of the sensor devices 2a, 2b and 2c can be transmitted to a vehicle-side electronic control device SE. The control unit SE is configured to detect people P, P' and useful items G1-G3, as well as relative distances of people P, P' or useful items G1-G3 from one another as well as between people P, P' and useful items G1-G3, by means of the sensor signals 2a, 2b and 2c received by the at least one sensor device 2a, 2b and 2c. Based on the relative distances, the control unit can associate each detected useful item G1-G3 with at least one person P, P'.

Said control device SE is equipped with at least one processor as well as a memory MEM, and is configured to generate control signals s1 to s4, in particular on the basis of the sensor signals of the sensor devices 2a, 2b and 2c, via which sensor signals different functions on the vehicle F can be triggered. An evaluation by the control device SE of the extent to which one control signal s1 to s4 or a plurality of control signals s1 to s4 are to be generated can also include signals of a vehicle-side detection device 3, which is coupled to the vehicle doors T1 to T5 of the vehicle F. The detection device 3 for example signals to the control device SE whether all the vehicle doors T1 to T5 of the vehicle F are closed and/or locked, or whether for example one of the vehicle doors T1 to T5 has just been closed.

The control device SE is furthermore coupled to a transceiver unit 30. Said transceiver unit 30 can be connecting to the detection device 3, although this is not essential. Via the transceiver unit 30, signals can be transmitted wirelessly to a mobile terminal M. A mobile terminal M of this kind is for example associated with the person P'. For example, the person P' can be a user of the vehicle F who is authenticated relative to the vehicle F by a transponder ID as an identification element. However, for receiving signals, and thus also messages, using the transceiver unit 30, it is not essential for the person P' associated with the mobile terminal M to also actually carry the transponder ID and/or to have been identified, via said transponder ID, with respect to the vehicle F and in particular with respect to the control device SE. This is nonetheless possible in a development. It can thus be provided, for example, that control signals s1 to s4, to be generated by the control device SE for triggering particular vehicle-side functions, depend on the presence of an operator event, which requires the presence of a vehicle user, identified by the transponder ID, in the vehicle interior I or in the surroundings of the vehicle F.

The control unit SE also acquires, via the sensor devices 2a, 2b and 2c, an orientation of the head of the person P. In the embodiment shown in FIG. 1, the control unit SE is configured to detect a visual level of attention, as the directed level of attention A, via the head orientation. The visual level of attention in particular includes the viewing direction of the person P. Furthermore, the visual level of attention includes a vision cone that is associated with the head of the person P according to the viewing direction. In this case, the vision cone corresponds to the number of possible viewing directions proceeding from the (current) head orientation.

In an alternative or supplementary variant, the directed level of attention can also be an acoustic level of attention. The acoustic level of attention can include a listening direction, from which sound waves can (currently) be particularly effectively perceived by the person P. This can in particular include the orientation of the ears, and thus of the head, of the person P within the vehicle interior I. Furthermore, possible obstacles around the person P can be detected, which lead to partial or complete shadowing of the person P with respect to soundwaves from a particular direction. According thereto, it is possible to detect the portion of the vehicle interior from which soundwaves can reach the at least one person P effectively.

Furthermore, the control unit SE is coupled to a plurality of displays D, and is configured to assign the person P one of the displays D as a signal output device for outputting signals that are individualized for the person P. In alternative variants, signal output devices can be any type of devices which are configured to output a signal that is perceptible for the person P. In particular, signal output devices of this kind can also be loudspeakers or indication lamps.

According to a first variant, it is proposed that at least one function on the vehicle F is triggered depending on at least one detected operator event and a detected useful item G1 to G3 in the surroundings of the vehicle or in a vehicle interior I. In this case, the at least one operator event includes at least a presence of the person P in the vehicle interior I. In particular, it is provided that, as a result, a signal or an indication relating to the detected useful item G1 to G3 is transmitted to the person P. In particular, in this case, in local public transport vehicles F, in response to the presence of at least one person, a signal for the at least one person can be output.

In a further variant of the proposed solution, it is proposed that at least one provided function should be triggered in an electronically controlled manner, by the control device SE upon detection of at least one further operator event and depending on a useful item G1 to G3 detected in the vehicle interior I or in the surroundings of the vehicle F. In this case, it is in particular provided, in the present case, that different useful items G1, G2 and G3 should be associated with different object classes K1 or K2, which are stored in a memory MEM of the control device SE, such that different functions can be triggered, optionally depending on the association of a useful item G1 to G3 with a particular object class K1 or K2, when a particular operator event has been identified. Thus, the control device SE is capable, for example using the sensor devices 2a, 2b, 2c, of identifying or distinguishing from one another a useful item G1 in the form of a mobile telephone, a useful item G2 in the form of a pair of skis, a useful item G3 in the form of a handbag, and/or a useful item in the form of a walking aid, i.e. a walking stick or a crutch. The individual useful items G1, G2 and G3 are thus associated with different object classes, of which two object classes K1 and K2 are shown by way of example in FIG. 1, in the memory MEM.

In an application scenario, the control device SE is for example capable of informing the person P', via the mobile terminal M, for example in the form of a mobile telephone, if one of the useful items G1 or G3 is still detected in the vehicle interior I after the person P' has left the vehicle F. In contrast, the fact that the useful item G2, located in the cargo space L in FIG. 1, has remained, is not signaled to the mobile terminal M when the person P' leaves the vehicle F. In a variant, a message to the mobile terminal M includes image data, which were generated by means of a sensor device 2*a* or 2*b* and which display the useful item G1 or G3 still located in the vehicle interior I, and/or its position in the vehicle interior I. Alternatively or in addition to a message on the mobile terminal M, another type of indication or alarm can be provided. Thus, for example, the control device SE can actuate one or more of the illumination and/or display elements 10, 10*a*, 4.1, 4.2, in order to output a corresponding display or illumination indicating that a particular useful item G1 or G3 has remained in the vehicle interior I. Alternatively or in addition, an output of a corresponding indication on a display element in the form of a display D can also be provided, which display is for example integrated in a pane of a vehicle door T1 on the vehicle F.

As an operator event, which causes an examination of the vehicle interior I, for useful items G1 or G3 possibly remaining therein, to be triggered, in another variant, alternatively or in addition, it is also possible to include the situation where a person P, P' performs a particular gesture, in the vehicle interior I or in the surroundings of the vehicle F. Thus, for example, after the vehicle F has been parked, a vehicle user can purposely trigger a check of the vehicle interior I for useful items G1 and G3 possibly still present therein, in order to receive an indication of their deposition location. The user can then consequently collect the corresponding useful objects G1 and G3, still before leaving the vehicle F.

In a variant, a region inside the vehicle interior I can also be defined using the sensor devices 2 and 2*b*, for which region there should be no indication or alarm in the case of useful items G1 and G3 (irrespective of their classification) located in said region.

Alternatively or in addition, it can be provided that particular people, who are for example individually identified to the control device SE, are always reminded of a useful item G1 or G3 left behind, which was linked to the corresponding person. Thus, for example, infrequent fellow passengers or strangers, who are also travelling in the vehicle F, can always be reminded of any useful items G1 to G3 left behind, when they leave the vehicle interior I.

The classification of a useful item G1, G2 or G3 to a particular object class can furthermore also be used for controlling particular adjustments of adjustment components provided within the vehicle interior I, with the respective useful item G1, G2 or G3. Thus, for example, during loading, a vehicle seat and/or a load-through on the vehicle seat can be actuated for adjustment actuated by external force, depending on a classification of a respective useful item, in order to provide sufficient space within the vehicle interior I for the respective useful item, or to highlight, for the user, a particular, intended deposition location for said useful item. For example, in the event of a person approaching with the useful item G2—here in the form of a pair of skis—a region of the cargo space L can automatically be enlarged by adjusting the rear vehicle seats.

In addition, by means of one or more of the control signals s1 to s4 of the control device SE, before or during introduction of a particular useful item G1 to G3 into the vehicle interior I, a predetermined deposition location for the respective useful item G1 to G3 can be purposely illuminated. In this way, a particular deposition location, considered advantageous for the respective useful item G1 to G3, can be automatically visually highlighted for the vehicle user, and thus offered by the control device SE.

Figure 2:
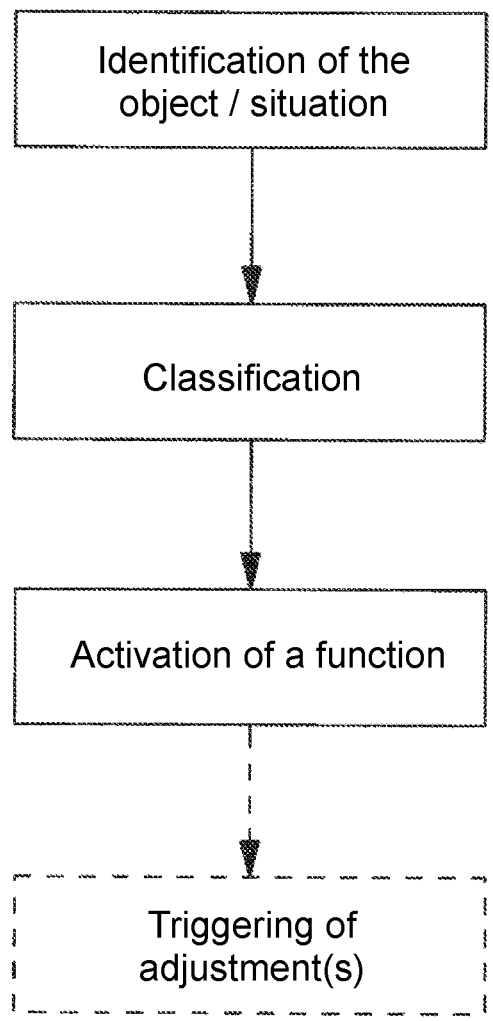
FIG. 2 is a flowchart for a variant of a proposed method for automatic triggering of a function on the vehicle side, in the case of a person, with a useful item that can be associated with a particular object class, approaching the vehicle.

FIG. 2 is a sketch showing the course of part of a possible variant of the proposed solution, which is used for example for loading a useful item G2 into the cargo space L of the vehicle F. In this case, firstly, in a first step, a particular operating situation is identified, for example in that an (authenticated) person P' approaches a rear of the vehicle F. A corresponding approach of a person P' can then for example also trigger an adjustment of the tailgate T5 when the vehicle F is parked. In addition, detection takes place of the useful item G2, carried by the person P', in the surroundings of the vehicle F. This object detection is associated with an object identification, by means of which the useful item G2 is identified as belonging to a particular object class K1 or K2. The classification of the identified useful item G2, which takes place for this in a following step, then leads, within the control device SE, to activation of a particular function, such as the illumination of the cargo space L in merely a predefined region in which the useful item G2 is to be deposited. Alternatively or in addition, an adjustment of at least one adjustment component in the vehicle interior I can be triggered. This then leads, for example, to automatic folding down of a load-through and/or an adjustment of vehicle seats in the vehicle interior I, in order to provide and/or purposely enlarge a deposition location for the useful item G2.

Figure 3:
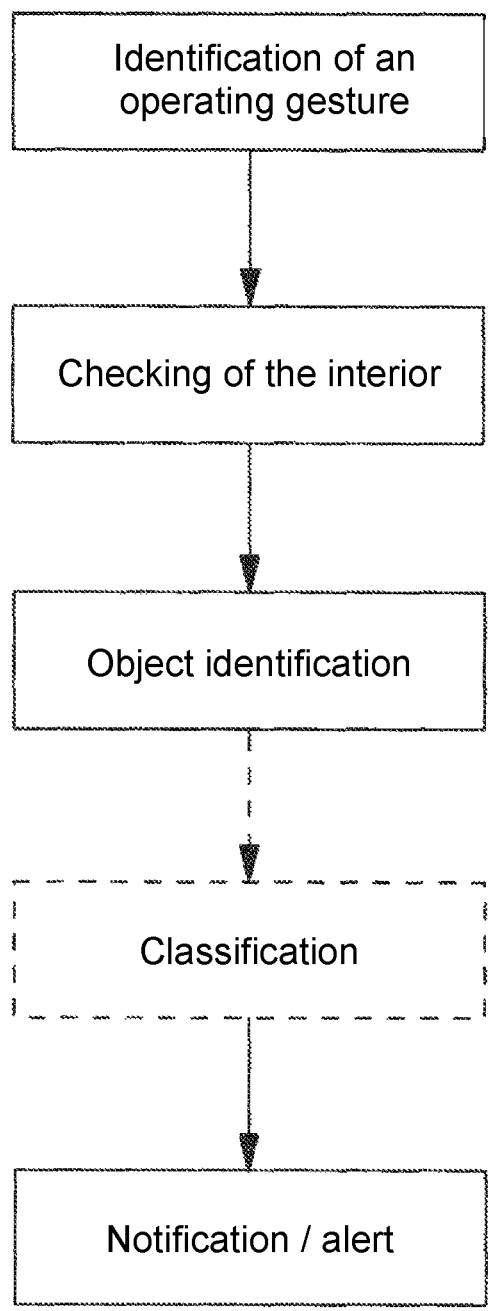
FIG. 3 is a flowchart for a further variant of a proposed method for triggering a function on the vehicle side in response to a useful item detected in a vehicle interior.

In a variant according to FIG. 3, an object identification for a useful item within the vehicle interior I is provided, for example in order to indicate useful items G1 or G3 possibly forgotten in the vehicle interior I.

In this case, in initially a particular operator event is identified, for example the person P leaving the vehicle F or the person P performing a particular (operating) gesture. Performing of said gesture can be detectable in a contactless manner by one or more of the sensor devices 2*a* to 2*c*, for example. In response to a correspondingly identified operator event (inside or outside the vehicle F), the vehicle interior I is then checked for useful items G1 or G3 located therein. If a useful item G1 or G3 is identified within the vehicle interior I, an indication and/or an alarm is output, for example via the display D on the vehicle door T1 or on the mobile terminal M. Alternatively or in addition, at least one of the illumination and/or display elements 10, 10*a*, 4.1 or 4.2 on the vehicle interior side can also be actuated for outputting a corresponding indication or a corresponding alarm.

Optionally, the triggering of the corresponding indication and/or alarm function is also dependent on not just any useful item being detected inside the vehicle interior I. Rather, it can then also be decisive that a useful item G1 or G3 has been identified which is assigned a particular object class K1 or K2, for which the respective indication and/or alarm function is stored.

Figure 4:
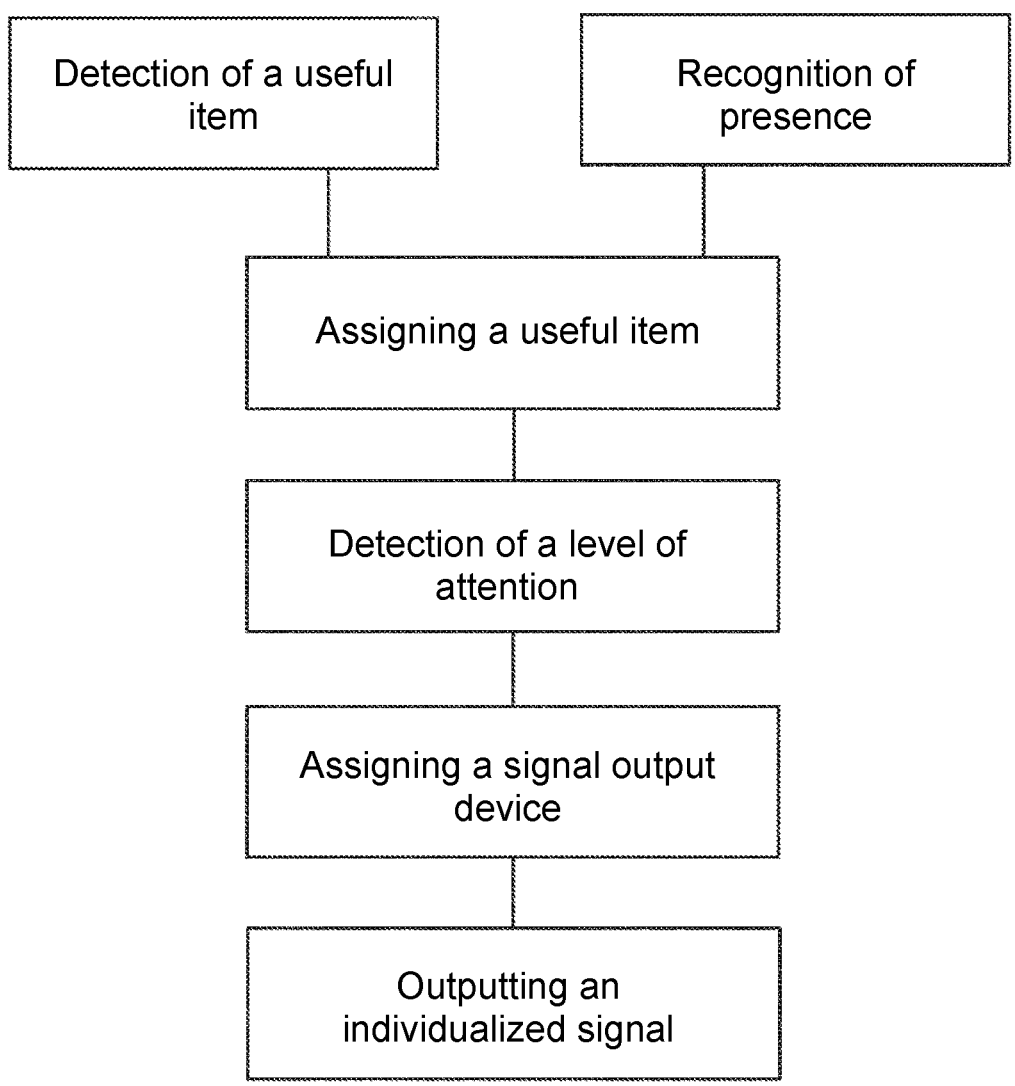
FIG. 4 is a flowchart for a further variant of a proposed method for outputting a signal via a signal output device associate with a person.

FIG. 4 shows an extended course of a variant of the proposed solution. According thereto, in response to both a useful item G1-G3 and a presence of the person P in the vehicle interior I being detected via the at least one sensor device 2*a*-2*c*, the useful item G1-G3 is associated with the at least one person P, via the control unit SE.

Subsequently, the interior portion to which the level of attention A of the at least one person P is directed is acquired. Depending on the interior portion, the at least one person P is assigned a signal output device (such as the illumination elements 4*a* and 4*b* and the illumination and display elements 10 and 10*a*), which is located within the interior portion or is at the smallest distance, of all the available signal output devices of the vehicle F, from the interior portion. The directed level of attention A includes in particular a viewing direction and a listening direction of the person. A signal that is individualized for the at least one person P is output via the signal output device associated with the at least one person P. The signal output device is a device which is coupled to the control device SE and which, triggered by the control device SE, outputs a signal that is perceptible for a person. By way of example, such signal output devices can in particular include displays, loudspeakers and/or any type of illuminants. Thus, the signal can be output in a targeted manner for the person P, via a signal output device present in or on the vehicle F in the viewing direction or the listening direction of the person P.

In a supplementary embodiment, the output of the signal can be coupled to a trigger condition. According thereto, the signal can, by way of example, be output by the signal output device associated with the person P only when the person P approaches one of the vehicle doors T1-T4.

In a further variant, in which likewise a function on the vehicle side using the sensor devices 2a and 2b monitoring the vehicle interior I is decisive, triggering of a function is provided in a manner dependent on a detected interior situation. In this case, it is identified, for example, whether two people are talking inside the vehicle interior I, for example in that they are looking at one another and their lips are moving, or in that sounds indicative of a conversation, in particular words or sentences, are actually identified by microphones and downstream evaluation within the control device SE. In this connection, it can also be provided that the control device SE identifies sounds, for example words or sentences spoken, and concludes therefrom that there is a conversation between two people located in the vehicle interior. In this case, the positions of the conversation participants can be determined by a plurality of microphones (as part of one or more of the sensor devices 2a or 2b) and triangulation or trilateration.

If a conversation situation is identified by sensors, for example vehicle seats 1b and 1c, on which the conversation participants are sitting, can be rotated towards one another, and thus transferred into a discussion position. Alternatively or in addition, for this purpose backrests of the respective vehicle seats 1b and 1c can be adjusted.

In a possible development, alternatively or in addition, in the event of a detected conversation, an audio system of the vehicle F is automatically actuated. Then, for example, the conversation can be purposely amplified using the audio system. Likewise, a reduction, optionally also only in regions, of an audio output by the audio system, is possible. This for example includes the volume of output music automatically being reduced if a conversation is identified inside the vehicle interior I, optionally depending on the conversation lasting for a minimum time period (for example for more than 5 seconds).

However, the automatic triggering of at least one function on the vehicle F can in principle also take place depending on at least one other interior situation. For example, upon detection of a person reading, on one of the vehicle seats 1, 1a to 1c (e.g. on the basis of said person looking for a longer period at a particular medium, such as a book held in the hands, or on the basis of a particular pattern of eye and/or hand movements), light inside the vehicle interior I can be purposely directed or repositioned to a position in the vehicle interior I (e.g. the medium held in the hand).

The proposed solution furthermore also includes the situation where an adjustment of at least one adjustment component in the vehicle interior I can depend on a posture of a user, in particular on one of the vehicle seats 1 or 1a to 1c. Thus, for example, the position of the vehicle 1, 1a to 1c in the vehicle interior I or at least individual (adjustment) components of the vehicle seat 1, 1a to 1c can always be repositioned in such a way that the respective posture of a seat user is optimally supported. Consequently, in this case, a setting of the respective vehicle seat, in particular in view of its backrest, can be provided based on an evaluation of data regarding the current posture of the respective user, acquired by means of a sensor device 2a or 2b. For example, if a passenger turns to the driver of the vehicle F, the backrests of the passenger's vehicle seat is correspondingly also rotated automatically.

In a possible development, it is provided that an automatic adjustment to a vehicle seat is carried out only in particular operating situations, for example not while driving or not while a seat user is asleep. Alternatively or in addition, the current movement direction of the vehicle F can be taken into account in the adjustment, for example in order to reduce the impacts of a crash situation. Thus, for example, an adjustment of a vehicle seat 1, 1a-1c into a particular position can be excluded during travel of the vehicle F, but can be permitted when the vehicle F is stationary.

LIST OF REFERENCE NUMERALS 1, 1a, 1b, 1c vehicle seat
10, 10a illumination/display element
2a, 2b, 2c sensor device
3 detection device
30 transceiver unit
4.1, 4.2 illumination element
B vehicle floor
D display (display element)
F vehicle
G1, G2, G3 useful item
I vehicle interior
ID transponder (identification element)
K1, K2 object class
L cargo space
M mobile terminal
MEM memory
P, P' person
A directed level of attention
s1-s4 control signal
SE control device
T1-T4 vehicle door
T5 tailgate (rear vehicle door)

The invention claimed is:

1. A method for controlling at least one function on a vehicle, comprising at least the following steps:
   detecting a useful item in surroundings of the vehicle or in an interior of the vehicle by at least one sensor device of the vehicle, and
   triggering at least one function on the vehicle depending on at least one detected operator event and detection of the useful item,
wherein the at least one detected operator event comprises a presence of at least one person in the interior, and a level of attention of the at least one person directed towards a portion of the interior, on which the at least one triggered function is dependent, is detected by the at least one sensor device.

2. The method according to claim 1, wherein the triggering of the at least one function on the vehicle depends, in addition to the detection of the useful item, on an electronic classification of the useful item to a predefined object class.

3. The method according to claim 2, wherein, depending on assignment of the useful item to the predefined object class, an actuation of at least one illumination and/or display element present in the interior of the vehicle takes place.

4. The method according to claim 3, wherein the at least one actuated illumination and/or display element is associated with the predefined object class.

5. The method according to claim 1, wherein the triggering of the at least one function on the vehicle is additionally dependent on where and/or when, in the surroundings of the vehicle or in the interior of the vehicle, the useful item is identified, and/or where the vehicle is located.

6. The method according to claim 1, wherein the at least one triggered function comprises wireless transmission of a message to at least one mobile communications device and/or display of a visual indication on a display element on the vehicle.

7. The method according to claim 6, wherein the at least one sensor device operates in a contactless manner, wherein the at least one sensor device comprises a camera and/or a radar and/or lidar sensor and the message contains image data for an image of the useful item acquired by the at least one sensor device.

8. The method according to claim 6, wherein the at least one person is assigned a signal output device for outputting individualized signals, depending on the detected directed level of attention of the at least one person, wherein the signal output device comprises the display element.

9. The method according to claim 1, wherein the at least one sensor device operates in a contactless manner.

10. The method according to claim 9, wherein the at least one sensor device comprises a camera and/or a radar and/or lidar sensor.

11. The method according to claim 1, wherein the detected useful item is associated with the at least one person by a control device.

12. The method according to claim 1, wherein the at least one person is assigned a signal output device for outputting individualized signals, depending on the detected directed level of attention of the at least one person.

13. The method according to claim 12, wherein an individualized signal for the at least one person is output via the signal output device, in response to a trigger condition.

14. The method according to claim 1, wherein, for the detected directed level of attention an orientation of a head of the at least one person within the interior of the vehicle is detected, and a vision cone is determined for the at least one person, based on the detected orientation of the head, and is associated with the at least one person.

15. The method according to claim 1, wherein, for the directed level of attention, a listening direction of the at least one person is detected.

16. A control system for electronic control of at least one function of a vehicle, wherein the control system is configured to carry out the method according to claim 1.

17. A computer program product for a control system of a vehicle, comprising instructions which prompt a processor of the control system, when carrying out the instructions, to carry out the method according to claim 1.

* * * * *